ELECTRONIC SYSTEM

Filed Sept. 12, 1951 4 Sheets-Sheet 1

INVENTORS
Harold D. Goldberg
Milton I. Goldberg
BY
E. R. Fornack
ATTORNEY

ELECTRONIC SYSTEM

Filed Sept. 12, 1951 4 Sheets-Sheet 2

INVENTORS
Harold D. Goldberg
Milton I. Goldberg

BY

ATTORNEY

INVENTORS
Harold D. Goldberg
Milton I. Goldberg
BY
ATTORNEY

INVENTORS
Harold D. Goldberg
Milton I. Goldberg
BY
E. R. Pozniack
ATTORNEY

United States Patent Office 2,747,130
Patented May 22, 1956

2,747,130

ELECTRONIC SYSTEM

Harold D. Goldberg, Bronx, and Milton I. Goldberg, Brooklyn, N. Y.

Application September 12, 1951, Serial No. 246,318

18 Claims. (Cl. 315—8.5)

The present invention is related to the art including electron beam devices and is more particularly concerned with such devices adapted for use as scaling counters, indicators, or the like.

In many fields there is a need of a device which undergoes a complete cycle of operation once for a definite number of actuations. One such field is that of counting. For example, it may be desired to count a sequence of random or periodic impulses, such as in the field of radio-active measurements. The impulses may occur too rapidly or too closely in time to actuate a mechanical recording counter. However, by providing a fast-response scaling unit which can produce one output impulse for a fixed number of input impulses (say, for example, ten), the actual number of impulses can then be scaled down by a scaling factor of 10. By using a high enough scaling factor, or by using several scaling devices in cascade, the output impulses may be suitable for actuating mechanical recording counters, such as by electromagnetic relays or other electromechanical devices, suitable amplifiers being used where necessary.

In the electronic computer art, such scaling devices are known among which are common types using a ring arrangement of vacuum tubes. See, for example, the Proceedings of the Institute of Radio Engineers for August, 1947, at pages 756-767. Such devices are subject to the disadvantage that large numbers of tubes are necessary, rendering the circuit complex and its maintenance difficult.

According to one feature of the present invention, an improved scaling device is provided, using a single electron beam tube with a specially designed target electrode. This electrode is shaped so that, in conjunction with the tube circuit, it causes the beam to have a finite number of stable positions in which the beam necessarily stays. However, the beam may be caused to progress from one stable position to the next in sequence by application of an input impulse. After successively traversing the sequence of stable positions, in response to successive input impulses, the beam is caused to produce an output impulse, is returned to the initial position, and the sequence is repeated. Hence, one output impulse is produced for every cycle of a predetermined number of input impulses. The number of output impulses is thus a scaled-down version of the number of input impulses. If desired, these devices may be cascaded by coupling the output of one to the input of a succeeding one, whereby the resultant scaling factor is the product of the respective individual scaling factors.

When accurate counting rather than scaling is desired, a sequence of such devices may be used, each indicating directly one digit of the total number of impulses received. Thus, one device will indicate the units, another the tens, a further one the hundred, etc. The indications may appear as luminous spots opposite indicia on a fluorescent screen forming part of the tube, or may be made to appear directly as illuminated or fluorescent digits.

According to another feature of the present invention, similar results and advantages are attained by use of a specially designed light modifying element in cooperation with a cathode ray tube and photocells.

Accordingly, it is an object of the present invention to provide improved electron beam devices for scaling and/or counting.

Another object is to provide improved electron beam devices having a plurality of stable beam positions, with means for transferring the beam sequentially along these positions.

Yet another object is to provide improved electron beam devices with means for limiting movement of the beam.

A still further object of the present invention is to provide improved electron beam devices of the above type which are rendered relatively independent of variations in potential or tube characteristics.

Other objects and advantages of the present invention will become apparent from the following description of preferred embodiments of the invention, taken in conjunction with the appended drawings, in which—

In the following description, similar reference characters are used throughout to indicate similar structures.

Figure 1:
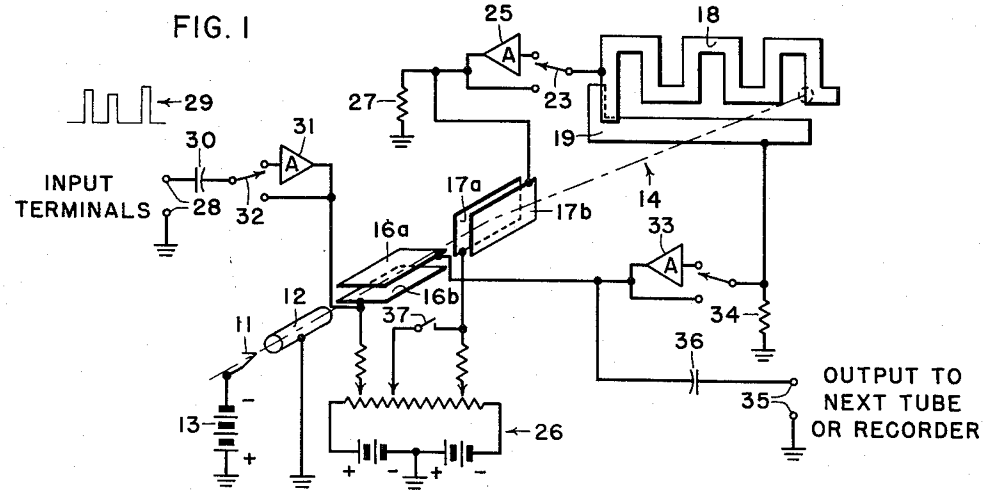
Fig. 1 is a schematic perspective view of the tube of one form of the invention, together with its associated circuit.
Figure 2:
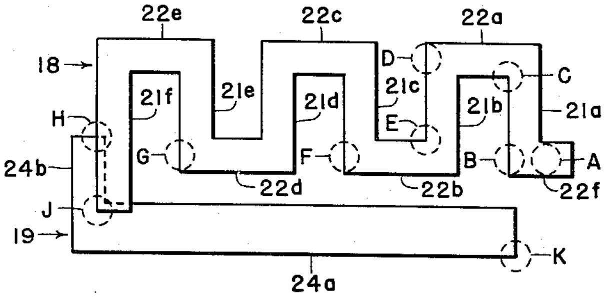
Fig. 2 is an enlarged view of the special target electrode of the device of Fig. 1, useful in explaining the principle of operation of the invention.

Referring to Figs. 1 and 2, there is schematically shown one form of tube according to the present invention, comprising a cathode 11 and accelerating electrode 12 connected respectively to the negative and positive terminals of a unidirectional voltage source 13, of any suitable type, such as a battery, to form an electron gun for producing a linear beam of electrons indicated schematically by the dash line 14. Electrode 12 is shown as grounded, although any other ground point in the device may be used. It will be understood that any conventional or desired form of electron gun may be used here or in the other hereinbelow described embodiments of the present invention.

Consecutively aligned with the electron gun 11—12 are a pair of vertical deflecting plates or electrodes **16*a*, 16*b* and a pair of horizontal deflecting plates or electrodes 17*a*, 17*b*. The order of arrangement of these pairs of plates is immaterial; either may be adjacent the cathode 11. In the beam path beyond these deflecting electrodes are the target electrode 18 and resetting electrode 19. As shown more clearly in Fig. 2, the target electrode 18 is rectilinearly serpentine in shape, having a series of vertical strips 21*a* to 21*f*, having their adjacent ends connected alternately by horizontal strips 22*a* to 22*e* and provided with a short horizontal end strip 22*f* connected to the free end of vertical strip 21*a*. As will be made clear hereinbelow, the particular number of vertical target strips 21 and horizontal target strips 22 shown is merely by way of illustration, since any desired number may be used according to the scaling factor desired. Resetting electrode 19 is located parallel to and in a plane disposed behind the target electrode 18, and has a horizontal portion 24a below the horizontal connecting strips 22b, 22d, 22f and also has a vertical end portion 24b partially overlapped by the extended end of target strip 21f. Target electrode 18 is connected to the right deflecting plate 17b, either directly or through an amplifier 25, according to the position of a switch 23**.

It will be understood that the terms "horizontal" and "vertical" are used merely to designate independent directions, usually but not necessarily perpendicularly arranged, and have no actual relation to any spatial datum.

The principles of operation of the device will now be explained. The horizontal deflecting plates 17a, 17b are given a suitable beam-deflecting bias (as by adjustable unidirectional deflecting voltage source 26 connected thereacross in series with resistor 27) so that the electron beam normally tends to assume some position such as indicated at A in Fig. 2. The beam thus is incident upon the horizontal target strip 22f, and the beam electrons are collected by the target electrode 18 and return to accelerating voltage source 13 by way of resistor 27 and ground. This produces a volt drop across resistor 27 such that right deflecting plate 17b repels the beam, which therefore moves left to position B, at which the cross-sectional area of the beam impinging upon the target electrode 18 is reduced, thereby decreasing the potential of deflecting plate 17b. As the beam moves further leftward, an equilibrium position is reached at which the leftward deflecting force due to the electrons collected by the target electrode 18 just balances the rightward deflecting force of bias voltage source 26. Thus, stable equilibrium exists at position B.

As shown in Fig. 1, input terminals 28 are provided to which may be connected any desired source of impulses to be counted or scaled. Schematically illustrated is a non-periodic pulse wave 29 which may be thus applied. Input terminals 28 are connected across the vertical deflecting plates 16a, 16b, by way of coupling condenser 30 and, if desired, an amplifier 31 (which may be of the limiting type), according to the selected position of switch 32. A bias voltage is derived from source 26 and applied to plate 16b through a high resistance which maintains high input impedance. The effect of the input wave 29 is then to deflect the electron beam vertically. It will be understood that the polarity of this input wave 29 is preferably so chosen that, in the illustrative system of Fig. 1, the beam is deflected upward during each of the input pulses.

Thus, as an input pulse is applied to the vertical deflecting plates, the beam is substantially instantaneously deflected upward. As it approaches a position such as C on target strip 22a more of the beam impinges on the target, so that the leftward deflecting force is increased, and the beam travels along the horizontal target strip 22a, as well as continuing upward, to a new position D at which the beam only partially impinges on the target electrode 18. This beam transit is almost instantaneous, since a small time constant is provided for the target electrode circuit. At position D equilibrium is established again, so long as the input pulse lasts. However, upon cessation of the input pulse, the vertical deflecting force is removed, and the beam falls, approaching position E, where more of the beam impinges on the target. Here again the leftward deflecting force exerts itself, and the beam finally terminates in stable equilibrium in another partially impinging position such as F. Thus, the effect of a single pulse is to move the beam from stable position B to stable position F. It will be apparent that the next input pulse will similarly move the beam along target strips 21c, 22c, 21d and 22d to a further stable position G. As many further strip sections similar to 21a—22a—21b—22b or 21c—22c—21d—22d may be used as desired, determined solely by the desired scaling factor or number of input pulses per complete cycle of operations. In the illustrative embodiment of Figs. 1 and 2, the scaling factor is 3, as will be clear from the following further exposition.

Upon the occurrence of a further pulse at input terminals 28, the beam similarly moves along target strips 21e, 22e and 21f, and approaches position H. As the beam nears H it impinges partly on target strip 21f and partly upon resetting electrode strip 24b. The resetting electrode 19 is connected directly (or through amplifier 33) to the upper vertical deflecting plate 16a and also by resistor 34 to accelerating voltage source 13. Thus, the electrons collected by resetting electrode 19 flow in resistor 34, producing a volt drop which causes the potential of deflecting plate 16a to become more negative, so that the beam is deflected downward. As it approaches a position such as J, the beam starts going off target electrode 18. The leftward deflecting force now weakens, and finally disappears when the beam no longer hits target electrode 18, and the bias voltage source 26 deflects the beam back toward the right. Also the downward motion of the beam continues until it only partially impinges upon resetting electrode portion 24a, so that the upward force due to the biasing voltage from source 26 is balanced by the downward force due to collection of electrons by electrode portion 24a. So the beam travels toward K and as it approaches K it starts off the resetting electrode 19, so that the downward deflecting force weakens and finally vanishes. The beam rises and continues moving rightward toward A, and thence settles into B, where it is again stable, in accordance with the action described above. Hence, the third input pulse restores the system to its original condition, and the cycle is ready to begin over again.

In this way, for every *n* input pulses (illustrated here for $n=3$), the system completes one cycle. The end of the cycle is indicated by the action of resetting electrode 19, which receives an impulse during the transit of the electron beam along its length. This impulse appears as a voltage pulse across resistor 34, and may be utilized to serve as a scaled down version of the input pulses, or to actuate a recorder or a further scaling device (using amplifiers where necessary), by way of output terminals 35 connected across resistor 34 through coupling condenser 36.

The present system is also provided with a reset, by which the system may be placed in its initial position (with beam at B) at will. Such a reset may be operated manually, as by closing a switch, or automatically, by providing a suitable input reset pulse. This is especially useful when commencing counting or scaling. For this purpose, in Fig. 1, a normally open reset switch 37 (which may be a spring-biased push-button switch or contacts of a relay) is connected so that when closed it impresses a positive voltage from bias source 26 upon deflecting plate 17a. Upon momentarily closing switch 37, the beam is deflected leftward beyond the end of target electrode 18 and resetting electrode 19. Upon opening of switch 37, the beam responds to the normal bias voltage from source 26 and moves rightward until it impinges upon resetting electrode portion 24b. Then the resetting action described above comes into operation and the beam is returned to stable position B, ready to start a new cycle. Resetting is also accomplished if the beam is pulled left just enough to impinge on electrode 19. It will be apparent that this manual reset may be employed no matter where the beam may be, and will always restore the beam to initial position B.

Another way to reset the system would be to pull the beam momentarily down, to or below resetting electrode 19. Then the beam, no longer experiencing a leftward deflecting force resulting from its impingement upon the target electrode 18, moves toward the right to a position below position A. Upon release of the beam, it moves upward toward position A, and is carried back to position B by the action already described. Such downward pulling of the beam could be provided by momentarily connecting upper deflecting plate 16a to a negative potential, or lower deflecting plate 16b to a positive potential, these potentials being derived from bias source 26 in a manner similar to switch 37 and its circuit, or in any other suitable way.

An additional way to reset the system is to cut off the beam momentarily. As a result of cutting off the current to target electrode 18 there is no longer produced any leftward deflecting voltage. Hence when the beam is reestablished it will be directed toward position A from where it will be carried to position B.

The system just described utilizes the collection of electrons by the target electrode 18 or the resetting electode 19 to produce a volt drop in a corresponding resistor 27 or 34, and thereby to control the beam position. Improved and enhanced operation is obtained by making these electrodes 18 and 19 of a secondary emissive material, preferably with a high secondary emission ratio, so that many secondary electrons are produced for each primary electron impinging upon the electrode. A suitable material for this purpose is beryllium copper, although any other secondary emissive material may be utilized. In this case, since for each impinging electron several secondary electrons leave the target or resetting electrodes, these electrodes become positively charged in response to impinging of the electrons thereon, instead of negatively charged as in Fig. 1. Hence, minor changes in circuit are necessary, as shown in Fig. 3, to accomplish the desired purposes of the invention.

Figure 3:
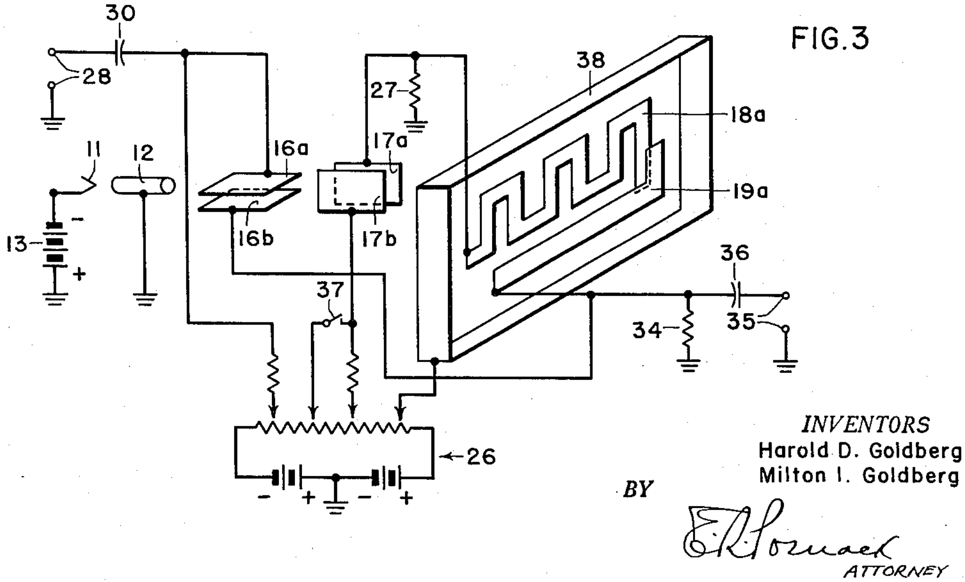
Fig. 3 shows a device and circuit similar to Fig. 1, but adapted to use the principle of secondary emission.

In Fig. 3, the same elements are given the same reference numerals as in Fig. 1, but the secondary emissive target electrode is now designated as 18a and the secondary emissive resetting electrode as 19a. The target electrode 18a is now connected to the left deflecting plate 17a, so that its positive potential due to secondary emission produces the same leftward beam movements as in Fig. 1. Similarly, resetting electrode 19a is now connected to the lower deflecting plate 16b to produce the same downward beam movement as in Fig. 1. A secondary electron collector electrode 38 maintained at a slight positive potential by its connection to source 26 has been added to collect the secondary electrons. The operation of this system is thus the same as in Fig. 1, but with improved effectiveness, since the phenomenon of secondary emission produces greater beam control voltages. Amplifiers 25, 31 and 33 have not been shown in Fig. 3, but may be used when desired or necessary.

It will thus be seen that to create a force for displacing the electron beam in a given direction where a non-secondary emissive target or resetting electrode is utilized, it is merely necessary to connect that electrode to the opposite deflecting plate. Thus, if the beam is to be displaced leftward in response to its impingement upon the target or resetting electrode, that electrode is connected directly (or through an amplifier) to the right horizontal deflecting plate. If the beam is to be displaced upward, the electrode is connected to the lower vertical deflecting plate, etc. However, where a secondary emissive target or resetting electrode is utilized, the connection is just opposite to that just described; namely, for leftward displacement, the target or resetting electrode is connected to the left horizontal deflecting plate, for upward displacement to the upper vertical deflecting plate, etc.

It will also be understood that where the target or resetting electrode is connected to one of a pair of deflecting plates, the biasing potential, as from source 26, determining the normal uncontrolled position of the beam will generally be connected to the other of that pair of deflecting plates and with the proper polarity to produce the desired normal beam position in accordance with well-known conditions. Thus, if the beam is normally to be positioned to the right of its central position along the electron gun axis, a positive potential will be applied to the right horizontal deflecting plate or a negative potential to the left horizontal deflecting plate, according to which deflecting plate is utilized for this purpose.

In the following discussion various modifications of target and resetting electrode structure and refinements thereon will be described. For convenience the beam projecting and deflecting mechanism will not be illustrated, but it will be understood that in each instance a circuit such as in Fig. 1 or in Fig. 3 is utilized with the target and resetting electrodes connected to the deflecting plates in the manner just discussed, depending upon whether the electrode is or is not secondary emissive, to produce the desired indicated direction of force upon the beam. Also, it will be understood that any of the electrode systems herein disclosed may be secondary-emissive or non-secondary-emissive, as desired. Where secondary emission is utilized, a collector electrode such as 38, is provided.

Figure 4:
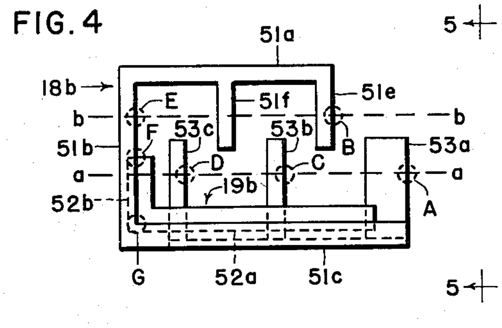
Fig. 4 is a plan view of a modified target and resetting electrode structure.
Figure 5:
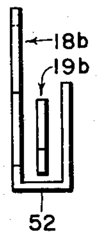
Fig. 5 is an end view of the structure of Fig. 4.

Figs. 4 and 5 show an alternative form of target and resetting electrode structure which may be used in place of the corresponding electrodes of Figs. 1 and 3. As in Figs. 1 and 3, the electrode structure consists of a main target electrode 18b and a resetting electrode 19b. The target electrode 18b consists of a metallic rectangular frame having sides 51a, 51b, 51c and a plurality of tabs or fingers 51e, 51f extending from side 51a toward side 51c, generally parallel to the other side 51b. The resetting electrode 19b is located in a plane parallel to and beyond the target electrode 18b, and has two portions 52a, 52b respectively partially overlapping and extending partially outward from target electrode sides 51c, 51b. A further plurality of tabs or fingers 53a, b, c, are located in a plane back of resetting electrode 19b, and extend from target electrode side 51c toward 51a, and adjacent to or between the generally parallel portions 51e, 51f, 51b of target electrode 18b. Resetting electrode portion 52a extends completely across fingers 53b, 53c, but only partially across the first finger 53a, which as shown may be wider than its companions. If desired, fingers 53a, b, c may be connected together and form a separate electrode, conductively connected to electrode 18b, as by a lead, but these fingers are preferably each individually joined directly to the target electrode portion 51c. If desired, however, the resetting electrode 19b may be positioned completely in front of the target electrode 18b, without altering the operation described hereinbelow.

The deflecting voltage bias is chosen so that the normal position of the beam is beyond the entire electrode structure on its left. The main target electrode 18b is then connected to deflection electrode system so that when the electron beam impinges upon electrode 18b, it is deflected to the right. The potential applied to the vertical deflecting electrodes is normally such that the electron beam is maintained along line *a—a* of Fig. 4.

In commencing operation, the beam is initially momentarily deflected to the extreme right beyond the entire electrode structure, but still along line *a—a*. This may be done by applying a potential to the horizontal deflecting plates as by a switch arrangement similar to switch 37. Upon cessation of this momentary potential, the beam swings left along line *a—a* until it impinges upon the right edge of electrode strip 53a. As more and more of the beam impinges upon strip 53a, a larger and larger rightward force is created until a stable equilibrium is reached at position A, which is partly on and partly off the finger 53a.

Upon receipt of an impulse to be counted or to be scaled, the beam is deflected vertically to a position on a line such as *b—b*. Hence, the beam will rise and clear the end of finger 53a. It will therefore now swing to the left, since the restraining force provided by finger 53a in opposition to the normal leftward deflecting bias no longer exists. The beam will now move to the left until it reaches a new equilibrium position, as at B.

Upon cessation of the input pulse, the beam returns to line *a—a*, and similar motion will cause the beam to assume the new equilibrium position C. Thus, each of the upward-extending fingers 53*a*, 53*b*, 53*c* provides an equilibrium position, and any number of fingers may be used, as desired.

The resetting electrode 19*b* is so connected to the vertical deflection electrode system 16*a*, 16*b*, in the manner discussed above, as to deflect the beam downward whenever the resetting target 19*b* is contacted by the beam. Thus, when an input pulse is received with the beam in position D, the beam is carried to position E. Upon termination of the input pulse, the beam drops toward position F. Near this position the beam contacts the portion 52*b* of the resetting electrode 19*b*, so that the beam is dropped toward the position G. And as it nears position G the beam contacts strip 51*c* of target electrode 18*b*. The beam will therefore now be deflected toward the right by virtue of the increased rightward force developed by its impinging upon strip 51*c*. It will also continue downward until it comes to equilibrium partly below the upper edge of target strip 51*c*, for it has now gone partly off resetting electrode 19*b*. The beam will then travel toward the right, staying at the upper edge of target strip 51*c* until it slides off the right end of the resetting electrode 19*b*. It will then travel upward toward line *a—a* because the downward-deflecting force is eliminated. The travel toward the right will also halt when it is partly off the finger 53*a* at position A. In this way resetting is accomplished after completion of the pulse cycle.

It will be understood that similar action would take place if line *b—b* were used for the initial equilibrium line for the beam. In this case, the pulses to be counted could be required to deflect the beam downward.

Figure 6:
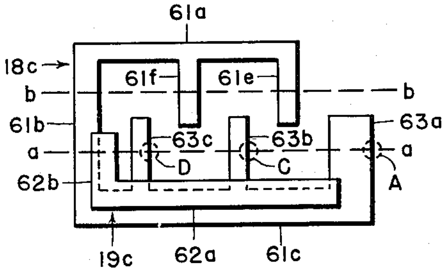
Figs. 6 through 11 are further forms of electrode structure, useful in similar manner to the electrode structure of Figs. 2, 3 and 4.

In Fig. 6 is shown a modified form of target and resetting electrode structure similar to that of Figs. 4 and 5. However, in Fig. 6 the target electrode 18*c* is simplified with respect to Fig. 4 in that it may be fabricated entirely from a plate piece of metal instead of requiring the connection of fingers or strips such as 53*a*, 53*b* or 53*c*, in a different plane. In Fig. 6 the target electrode 18*c* is formed with a top strip 61*a*, a left side strip 61*b*; and a bottom strip 61*c*. Depending fingers or strips 61*e* and 61*f* are connected to the upper strip 61*a*, and upwardly projecting fingers or strips 63*a*, 63*b* and 63*c* are connected to the lower strip 61*c*.

The resetting electrode 19*c* has a lower strip portion 62*a* and a left side strip portion 62*b*, just as in Fig. 4. The resetting electrode 19*c* is located here in front of the target electrode 18*c*.

The normal uncontrolled position of the beam, as determined by the bias deflecting potentials from a source such as 26, is selected or adjusted to be at a position to the left of the entire electrode structure 18*c*, 19*c*, and along a line such as *a—a* intersecting the upward-extending finger strips 63*a*, 63*b*, 63*c*. The target electrode 18*c* is coupled to the deflecting plates to provide a rightward control force upon the beam in response to impingement of the beam upon the target. As in all the previous embodiments of the invention, this control force is large enough to overcome the bias potential when all the beam impinges upon the electrode. The resetting electrode 19*c* is coupled to the deflecting system so as to produce downward movement of the beam in response to its impinging upon the resetting electrode 19*c*.

The stable beam positions A, C and D are therefore the same as in Fig. 4. In commencing operation, the beam is initially momentarily deflected to the extreme right beyond the entire electrode structure, but still along line *a—a*. This may be done by applying a potential to the horizontal deflecting plates as by a switch arrangement similar to switch 37. Upon cessation of this momentary potential, the beam swings left along line *a—a* until it impinges upon the right edge of target electrode strip 63*a*. As more and more of the beam impinges upon strip 63*a*, a larger and larger rightward force is created until a stable equilibrium is reached as at position A.

Upon occurrence of an actuating impulse, the beam is raised over the top of strip 63*a*. The rightward force thus vanishes and the beam swings left to the edge of strip 61*e*, where the rightward force recurs to halt the beam. Upon cessation of the actuating impulse, the beam swings down below the lower edge of strip 61*e*, whereby the rightward balancing force vanishes, and the beam swings left to the second stable position C. Similarly, the next actuating impulse moves the beam to stable position D.

The next actuating impulse moves the beam in the same manner to contact target strip 61*b*, and its cessation causes the beam to drop into contact with resetting electrode strip 62*b*. The resetting electrode now forces the beam downward. The beam also travels somewhat to the left until it again contacts target strip 61*b* at the left edge of resetting strip 62*b*. The beam continues downward to the bottom edge of the resetting electrode, where the beam impinges partially upon target strip 61*c* and partly on resetting strip 62*a*. The portion of the beam hitting target strip 61*c* creates a rightward force which moves the beam to the right, while the part of the beam hitting resetting strip 62*a* keeps the beam at the lower edge of strip 62*a*. The beam thus travels rightward beyond the edge of strip 62*a*, so that the downward force vanishes, allowing the beam to return to stable position A. Thus, action here is essentially the same as in prior figures.

During the operation of electron beam devices of the type discussed above, variations in operating conditions occur due to many effects, such as drift in the operating voltages, aging of the electron beam tube or its power supply, changes in the condition of electrode surfaces with age or use, variations in external magnetic fields, etc. Also, for purposes of production, there may be variations in characteristics between one tube and another which are unavoidable in manufacture. Furthermore, the input voltage impulses which actuate the tube and cause it to count or step may have varying magnitudes due to these factors or other reasons. It is therefore highly important to make the device as independent as possible of all of these variable effects. One way to accomplish this result, in part, is to provide a limiter stage between input terminals 28 and the deflecting plates 16*a*, 16*b*. If desired, amplifier 31 may be a limiting amplifier. However, to achieve greater stability by compensating for variations in the electron beam device itself and its power supply, and to avoid complexity of circuitry, it is desirable to incorporate features in the tube itself which will produce the same result.

Figure 7:
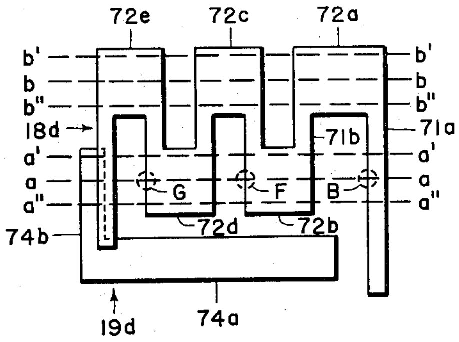

Fig. 7 shows a target and resetting electrode structure of the general type of Fig. 2, particularly adapted to compensate for variations in the actuating voltage and in the initial adjustment or setting of the device. The structure of the target electrode 18*d* of this figure is essentially the same as that of Fig. 2. However, the horizontal strip 22*f* of Fig. 2 has been eliminated. The portion 24*a* of the resetting electrode 19 of Fig. 2 has been shortened slightly to terminate just below the open part of the inverted U formed by strips 21*a*, 22*a* and 21*b* of Fig. 2, and strip 21*a* has been extended down beyond the resetting electrode portion 24*a*. These features are illustrated in Fig. 7 where strip 71*a* corresponds to former strip 21*a* of Fig. 2, strip 72*a* corresponds to strip 22*a*, etc. Furthermore, in Fig. 7 the horizontal strips 72*a*, 72*b*, 72*c*, 72*d* and 72*e* have been materially increased in thickness with respect to the corresponding strips of Fig. 2.

Thus, the normal operating position of the beam in the absence of actuating impulses is along line *a—a*. Variations in the operating conditions of the tube which might cause the beam to shift upward as far as line *a'—a'* or downward as far as line *a''—a''* are ineffective to affect proper operation. Similarly, normally the input actuating impulse will raise the beam to a position along line *b—b*. However, variations in either the actuating impulse amplitude or other operating conditions of the tube so as to vary the upper position of the beam anywhere between lines b'—b', b''—b'' will also not affect the operation of the device. Accordingly, wide variations in these operating conditions can be tolerated without affecting operation.

It will be understood that variations in the horizontal-deflecting bias voltages or electron-responsive voltages are also ineffective to prevent proper operation since the horizontal position of the beam is not determined by the voltage magnitudes but by the balance between a biasing voltage urging the beam in one direction and a control force produced in response to impingement of the beam on the target electrode, urging the beam in the other direction. Thus, in Fig. 7 the stable positions B, F and G of the beam are the same as in Fig. 2. The beam is normally urged to the right of the entire electrode structure of Fig. 7 along line *a*—*a* by its bias deflecting voltages, and is urged to the left in response to impingement of the beam on the target electrode, and downward upon hitting the resetting electrode 19*d*.

In initiating operation, the beam is momentarily set, in the manner described above, entirely to the left of the electrode structure. Then upon cessation of this momentary voltage, the beam swings to the right until it hits the resetting electrode portion 74*b*. This forces the beam downward to the strip 74*a*, and it travels rightward along the bottom edge of the lower resetting electrode portion 74*a* to its end. Then the beam travels up and rightward, until it settles at stable position B, where the leftward force developed by its impingement on the target electrode balances the rightward deflecting voltage force. This places the beam in the initial position for commencement of counting or stepping. As before, the beam will step from position B to F in response to one actuating pulse, from F to G in response to another input pulse, and in response to a third actuating pulse the beam will come under the influence of the resetting electrode 19*d* which restores the beam to position B.

As indicated above, wide variations in operating conditions or input voltage pulse can be tolerated, by virtue of the widened target strip portions 72*a*, 72*b*, 72*c*, 72*d*, 72*e*.

Similarly the type of structure shown in Fig. 6 may be modified so as to tolerate wide variations in operating conditions or input voltage pulse by increasing corresponding dimensions. In such a modification the free ends of the fingers of Fig. 6 would remain in the same positions as before but their lengths would be increased. The new structure would thus be larger in its vertical dimension and would have spaces of increased height within it, and so would permit more latitude in its initial and operating beam positions.

Figure 8:
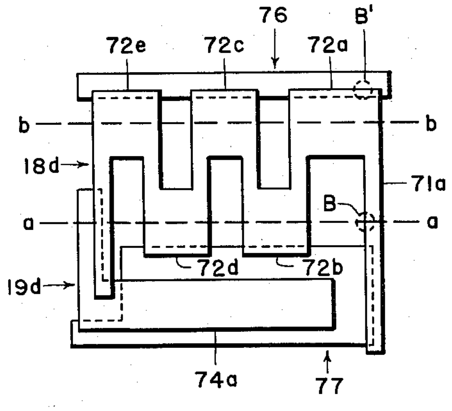

In case the actuating voltage should deviate so widely as to even exceed the broad limits permitted by the structure in Fig. 7, recourse may be had to special beam-limiting means shown in Fig. 8, in which is illustrated the same structure as in Fig. 7 with the addition of the limiting electrodes 76 and 77. Electrode 76 is formed as a continuous strip behind the target electrode 18*d*, overlapping the top edges of the horizontal strips 72*a*, 72*c* and 72*e*. The lower limiting electrode 77 is located behind both the target electrode 18*d* and the resetting electrode 19*d*, and overlaps the lower horizontal target strips 72*b*, 72*d*, the right target electrode strip 71*a* and the horizontal portion 74*a* of the resetting electrode 19*d*.

The upper limiting electrode 76 is connected to the beam deflecting system so as to produce a downward force on the beam. The lower limiting electrode 77 is connected to the beam deflecting system so as to produce an upward beam deflecting action.

Additional vertical deflecting electrodes to those shown in Figs. 1 and 3 may be incorporated into the deflection system to provide for these functions, as well as for the resetting electrode, and for the input signal.

It will be appreciated that the upper limiting electrode 76 may be connected directly to the resetting electrode 19*d*, since its action is similar. In this case, to provide an output signal, an auxiliary electrode may be positioned so as to receive the beam during resetting, and so provide an output pulse.

By the use of these limiting electrodes 76 and 77, any tendency of the beam to pass beyond the surface of the target electrode 18*d* is prevented. For example, if the beam were in its initial stable position B and an actuating impulse were applied which would tend to deflect the beam beyond the top of the horizontal target strip 72*a*, the beam would then impinge on the limiting electrode 76 which would produce a downward acting force, balancing the upward force of the actuating impulse so that the beam would not go beyond the position B'. Similarly, at the lower edges of the target electrode, the lower limiting electrode prevents the beam from going beyond the lower edges of strips 72*b*, 72*d*.

As has been mentioned above, additional vertical deflecting electrodes may be used to provide for the limiting electrodes. This may also be accomplished by using one deflecting electrode to provide for several control functions. For this purpose circuits may be employed, which may incorporate amplifiers, including those of the inverting type. Also certain of the electrodes which are struck by the beam may be poorly secondary emissive and others highly secondary emissive to aid in securing control with a minimum number of deflecting electrodes.

Figure 9:
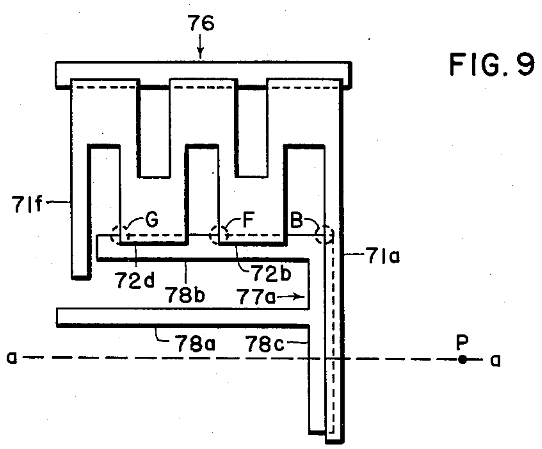

In Fig. 9, there is shown a modification of the device of Fig. 8 in which the lower limiting electrode is modified as shown at 77*a* to have two horizontal strips 78*a* and 78*b*, and vertical strip 78*c*. Strip 78*b* is located between and overlapping the lower horizontal target strips 72*b*, 72*d*. Strip 78*a* is located below strip 78*b* and extends leftward beyond the left vertical target strip 71*f*. The third strip 78*c* overlaps right vertical target strip 71*a* which is extended farther down than in Fig. 8. The resetting electrode is omitted entirely, and its function is taken over by the limiting electrode strip 78*a*. As described above, an auxiliary output electrode may be positioned to receive the beam during resetting action, to derive an output impulse.

As in Fig. 8, the upper limiting electrode 76 is connected to produce a downward force on the beam and the lower limiting electrode 77*a* is connected to produce an upward beam deflection, in response to the beam's impinging on these electrodes.

It will thus be clear that the limiting electrode 76 and the limiting electrode strip 78*b* operate in the same manner as the corresponding limiting electrodes 76 and 77 of Fig. 8.

In the system of Fig. 9, the beam is normally biased so as to be to the right of the entire electrode structure, and below the bottom of left vertical target strip 71*f*, but above the bottom of strip 78*c* of lower limiting electrode 77*a*. That is, the normal position of the beam is preferably somewhere along line *a*—*a* and to the right of the electrode structure as at point P, for example. To initiate operation, a momentary voltage may be applied to the horizontal deflecting system to move the beam to the left of the entire electrode structure. When this voltage is cut off the beam swings to the right until it impinges on limiting electrode strip 78*c* and the lower part of target strip 71*a*. The impingement of the beam on limiting electrode strip 78*c* forces the beam upward and as the beam impinges upon target electrode strip 71*a*, a leftward force is exerted on the beam. The result is that the rightward motion of the beam is checked, and it travels upward and comes to rest at position B where the upward force produced by the limiting electrode 77*a* is balanced by the downward force of the normal deflecting bias, and where the leftward force of the target strip 71*a* is balanced by the rightward force of the normal deflecting bias.

Thereafter the beam travels to the successive stable points F and G as in the previous figures. The third pulse brings the beam to the left edge of target strip 71f and upon its termination the beam drops downward. As the beam drops it goes off target strip 71f and consequently travels to the right. The downward motion of the beam is checked when the beam contacts strip 78a of lower limiting electrode 77a because of the upward force produced by it. And the rightward motion of the beam is checked when it contacts target strip 71a. However, as the beam approaches target strip 71a more of the beam impinges on limiting electrode 77a, whereupon the beam rises, coming to rest at position B, thus completing the resetting action.

The structure of Fig. 9 may be modified by omitting the downward extensions of limiting electrode strip 78c and target strip 71a below the bottom of limiting electrode strip 78a. In this case, however, to bring the beam up from point P to its initial operating position B, a momentary voltage may be applied to the deflection system to raise the beam up above the bottom of limiting electrode 78a, but below upper limiting electrode 76. While this voltage is maintained, the beam is also moved to the left of the entire electrode structure by a suitable horizontal deflecting voltage. This latter voltage is cut off, whereupon the beam swings to the right. If it was deflected above the bottom of target strip 71f it impinges on it, which halts its rightward motion. If below, it continues right until it strikes target strip 71a and thereupon resets itself. Upon subsequent cut off of the momentary upward deflecting voltage, the beam which impinged on target strip 71f also resets itself, as described above. A similar procedure would be followed in order to reset the beam from any position within the electrode structure to its initial operating position B.

In this way point P, the normal position of the beam, may be set as far below the electrode structure as necessary to assure performance under widely varying operating conditions.

Alternatively, the structure of Fig. 9 may be modified by omitting limiting electrode strip 78a. The action in this case would be similar except that during resetting, after the beam drops down off target strip 71f it continues downward toward line *a—a* as it travels toward the right. However, the device of Fig. 9 is somewhat faster in operation than this modified form, since less change in potential of the vertical deflection system is required during resetting, for there, after the beam drops down off target strip 71f, it continues downward only until it contacts limiting electrode strip 78a as it travels toward the right.

Figure 10:
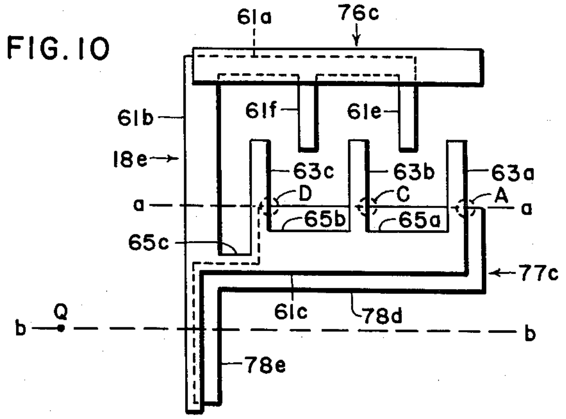

Fig. 10 shows the application of limiting electrodes to the structure of Fig. 6. Here again the lower limiting electrode replaces the resetting electrode, as in Fig. 9.

In Fig. 10, the target electrode 18e is similar to that of Fig. 6. However the portions 65a and 65b of lower target strip 61c between the upwardly extending strips 63a and 63b, and between 63b and 63c are here wider than in Fig. 6, and left hand target strip 61b is wider at its upper portion and extends down below the rest of the target electrode. Upper limiting electrode 76c is in front of target electrode 18e, and overlaps target strip 61a. Lower limiting electrode 77c, which also takes on the function of a resetting electrode, is behind the target electrode, and its horizontal portion, strip 78d, extends both below target strip 61c (for resetting, as will be explained) and above it (to determine the stable positions A, C, B in a vertical direction). Lower limiting electrode 77c also extends downward on its left side so that its vertical strip 78e overlaps the right side of the lower portion of target strip 61b.

The normal deflecting biases on the beam are selected to deflect the beam horizontally to the left of the entire electrode structure in Figure 10, and vertically below the top of the section 65c of target strip 61c which extends between finger 63c and target strip 61b, of target electrode 18e, but above the bottom of strip 78e of lower limiting electrode 77c. That is, the normal position of the beam is preferably somewhere along line *b—b* and to the left of the electrode structure as at point Q, for example. For initiating operation, the beam is momentarily deflected to the right of the electrode structure. When the rightward momentary bias is cut off, the beam swings left until it impinges on limiting target strip 78e and the lower part of target strip 61b. The limiting electrode is connected to produce an upward force, and the target electrode to produce a rightward force. The beam is therefore raised and also halted in its leftward motion. It rises until it starts to leave limiting electrode 77c at the lower edge of target strip 61c, and also begins to travel toward the right as soon as it reaches target strip 61c, which is horizontal. The beam continues toward the right until it passes the corner of target strip 61c where it is forced up farther by the action of limiting electrode 77c. It continues up to the top of limiting electrode 77c and comes to rest at stable position A.

The structure of Figure 10 may be modified, as was that of Figure 9, by omitting the downward extensions of target strip 61b and limiting electrode strip 78e below the bottom of limiting electrode strip 78d. In this case the beam may be brought to its initial operating position from its normal position by momentarily deflecting the beam upward above the bottom of limiting electrode strip 78d but below the top of target strip 63a, and also deflecting it to the right of the electrode structure. While still deflected upward, the rightward momentary bias is cut off, and the beam swings left until it strikes target strip 63a. This target strip is connected to produce a rightward force thus halting the beam. If the beam was deflected below the top of limiting electrode strip 78d the beam is now moved up to position A by the upward beam force produced by limiting electrode 77c. If it was deflected above the top of limiting electrode strip 78d the beam drops downward upon cutoff of the upward momentary deflection and is stopped by the action of limiting electrode 77c also at A. A similar procedure would be followed in order to reset the beam from any position within the electrode structure.

As in Figure 9, position A is essentially independent of variation in the vertical and horizontal deflecting biases or of tube characteristics, since the beam must always attain a stable position contacting both strip 63a and electrode 77c, which can be done only in the vicinity of line *a—a* and along the edge of strip 63a.

In response to the first input actuating impulse, the beam steps to stable position C. Upper limiting electrode 76c is connected to the deflecting system to produce a downward beam force, and thus prevents the beam from rising above the lower edge of limiting electrode 76c. Likewise the next actuating impulse steps the beam to stable position D.

The subsequent actuating impulse steps the beam over until it impinges upon left target strip 61b, which prevents further leftward movement. Upon the termination of the impulse the normal deflecting bias drops the beam toward the lower edge of target strip 61c, where the limiting electrode 77c prevents further downward movement. But as the beam drops, it impinges more fully upon target strip 61c, thereby increasing the rightward force to overcome the leftward deflecting bias so that the beam travels toward the right edge of target strip 63a. There more of the beam strikes lower limiting electrode 77c, so that the upward beam force is increased, and the beam returns to position A to complete the cycle.

Thus the limiting electrode 77c not only makes the beam position independent of the bias voltages, but also serves as resetting electrode.

The above embodiments of the invention have been concerned with the counting of similar pulses, illustrated as of the type producing upward deflection of the beam and hence termed positive pulses (although negative pulses can be used as will be descrbed below). It may be noted that along with a train of pulses being counted, there may be present extraneous pulses of opposite polarity. Limiting electrodes may be used to prevent such extraneous pulses from interfering with normal operation.

Figure 11:
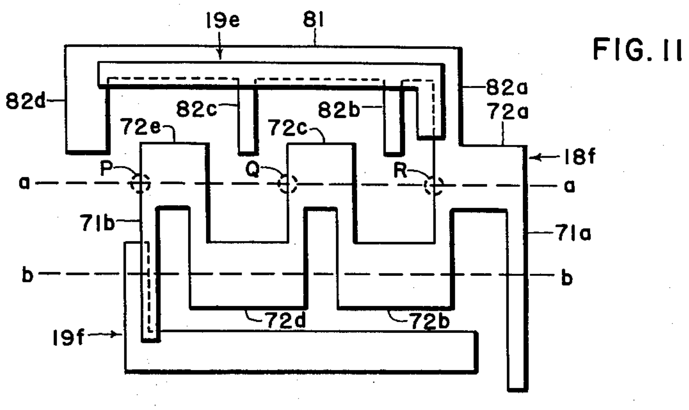

However it is to be understood that the principles of the invention can be equally applied to determining the algebraic sum of positive and negative quantities, that is, for both addition and subtraction of impulses. An electrode structure capable of producing this result is shown in Fig. 11. Here the target electrode 18*f* is formed as in Fig. 7 but with a further structure connected thereto comprising a horizontal strip 81 and vertical strips 82*a*, 82*b*, 82*c*, 82*d*, the latter three alternating with the horizontal portions 72*a*, 72*c* and 72*e* of the structure of Fig. 7. This device is essentially a superposition of the form of electrode of Fig. 7 with an inverted and reversed version of the lower part of the form of Fig. 6.

The beam is normally biased along the line *a—a* and to the right of the entire electrode structure. For initiating operation, the beam is momentarily deflected to the left of the entire electrode structure. Thereafter it swings right along line *a—a* until it strikes target strip 71*b*. The target electrode 18*f* is connected to the deflecting system to produce a leftward beam force, so that equilibrium is established at point P.

A positive actuating pulse raises the beam above the limit of strip 72*e*, and the beam then moves over to strip 82*c*; and, upon cessation of the actuating pulse, the beam drops below strip 82*c* and is biased rightward to new stable position Q. The next positive pulse steps the beam similarly to position R. The following input pulse raises the beam to contact resetting electrode 19*e*, which is in front of the target electrode 18*f* and connected to the deflection system to produce upward beam deflection. This carries the beam to the upper edge of electrode 19*e*, where it partially impinges on target strip 81, producing left movement to the left edge of strip 82*d*. Upon cessation of the actuating pulse the beam drops off strip 82*d* and then swings rightward to return to positon P, thus recycling the device.

If the beam is at position R, a negative pulse drops the beam to a position such as along line *b—b*, and it moves left to the left edge of strip 72*b*. On cessation of the actuating pulse, the beam rises to line *a—a* and moves left to position Q. Similarly, another negative-input pulse sends the beam to P. A subsequent negative actuating pulse drops the beam into contact with lower resetting electrode 19*f*, which is behind the target electrode 18*f* and is connected to the deflection system to produce downward beam movement. The beam thus moves down to the lower edge of strip 19*f*, and then is biased rightward beyond the end of strip 19*f* to strip 71*a* whereupon, after the cessation of the actuating pulse, it rises to line *a—a* and is returned leftward to position R by the action of target electrode 18*f*.

Thus positive pulses move the beam stepwise to the right, with self-recycling, and negative pulses move the beam similarly to the left. A combination of negative and positive pulses, in any sequence, will therefore leave the beam in a position corresponding to the algebraic sum of the positive and negative pulses.

Each of the two resetting electrodes may be connected to an appropriately placed deflecting electrode. Alternatively a circuit may be employed for this purpose in which the voltage pulse of one of the resetting electrodes is inverted and added to that of the other. This arrangement produces pulses of opposite polarity according to which of the resetting electrodes is energized. Consequently it requires connection to only a single deflecting electrode and so reduces the number required. Other means such as the use of a combination of primary and secondary emission may also be used for this purpose.

Output pulses for operating a following stage or for other functions may be derived from the resetting electrodes. Each resetting electrode may be connected to one of a pair of deflecting electrodes of the next stage. However, if means are employed for producing pulses of opposite polarity according to which of the resetting electrodes is energized, as described above, these pulses of opposite polarity may also be used as an output signal. If a succeeding tube is being used, only one deflecting electrode would be required in it for receiving the input signal.

It will be understood that limiting electrodes may be provided in Fig. 11 as well as in any of the other figures, in the manner discussed with respect to Figs. 8, 9 and 10, where desired.

In any of the embodiments of the invention in Figs. 1–10, it will be understood that the polarity of the input pulses need not necessarily be as described, but may be made opposite merely by changing the bias to provide a normal beam position along some line such as *b—b* of these figures, or by reversing their polarity by an inverting amplifier.

In any of the above described forms of the invention, resetting need not be performed manually by actuating a reset switch or the like. Instead, a suitable reset pulse can be impressed on the deflecting plates from any source, whether local or remote.

In each form of the invention, the device produces one output pulse across terminals 35 for each *n* pulse impressed across input terminals 28, and therefore provides an output scaled down by the factor *n*. As indicated above, the scaling factor *n* may take any desired value, depending upon the number of sections provided for the target electrode. Suitable values for *n* range from 2 to approximately 100. Physical limitations of space and size may limit the number of sections practicable to be included in the target electrode, thereby limiting the magnitude of the factor *n*.

However, a tube may be constructed employing a multiplicity of target electrodes operated by a single electron beam. The electron beam is caused to traverse the targets in succession, reset itself, and provide an output pulse. In this way a relatively high value of scaling factor may be obtained in a single tube with a comparatively short length of individual target.

As has been already mentioned, where it is desired to produce a scaling factor much greater than practicable for one tube, several tubes may be operated in cascade, with the output pulse from one tube serving as the input pulse to the next tube, and so forth. It will be apparent that the overall scaling factor for a multi-tube system will be the product of their individual factors. In this way, by the use of a relatively small number of tubes, large values of overall scaling factor may be produced. Alternatively, the structures for several such tubes may be included within a single envelope.

While the systems just described are highly useful in producing output impulses whose number is scaled down from the input impulses, as provided by either a noncyclic or a periodic pulse wave, they may also be utilized directly for visually indicating the number of impulses received. From Fig. 2, for example, it will be seen that at the stable positions of the beam, the beam is partly captured by the target electrode while part passes therebeyond. This is true of all forms of the invention described above. The portion of the beam passing beyond the target electrode may be utilized as a visual indication of the position of the beam and, hence, of the number of impulses received by the tube which placed the beam in its indicated position. The target may be made foraminous to distribute the portion of the beam passing beyond, over a larger area.

Thus, a fluorescent screen may be provided in the tube beyond the target electrode. In one illustrative embodiment of the invention, this fluorescent screen may be provided with permanent indicia, such as digits, at the respective stable or equilibrium positions of the beam. Then the particular digit or indicium which is illuminated by the portion of the beam passing the target electrode gives a visual indication of the number of pulses received by the tube.

In a complete system, for example, a sequence of tubes may be used, each having an *n* factor of ten, and with the output of the first tube coupled to the input of the second, etc. Then the first tube may be termed the "units" tube, a second the "tens" tube, a third the "hundreds" tube, etc. Each tube will be provided with a target electrode providing ten stable positions, aligned with each of which is a respective digit from zero to nine. The tubes may be so juxtaposed that a number of several digits may be easily read in natural sequence from the adjacent screens of the tubes. Such an arrangement is adapted for actual counting, or may be used for control of recorders or other equipment adapted to respond to the output pulse from the last (or any other) tube.

As an alternative type of indication, a masking member may be placed behind the target electrode and in front of the fluorescent screen. This masking member may be of conductive material and formed with apertures in the shape of digits. Each of the digit apertures may be aligned with a corresponding one of the stable beam positions. In this way, when the beam is in any equilibrium position, the portion of the electron beam passing by the target electrode will illuminate the aperture of the masking member, which will then absorb all electrons except those passing through its aperture. These latter electrons will pass through the masking member and will impinge upon the fluorescent screen to provide a luminous indication in the form of the digit itself. Aternatively the target itself may be formed with apertures in the shape of digits at the stable beam positions.

In addition to utilizing the portion of the beam flowing past the target electrode for purposes of indication, it may be also used for other controlling functions according to a predetermined count. Thus, an additional target electrode may be placed individually to intercept the transmitted beam portion at each of the stable positions of the beam. The resulting current flowing to each such additional target electrode may be used to operate auxiliary devices according to the position of the beam. Among such devices are those which provide controlling functions according to a predetermined count and devices to provide remote indication of the position of the beam. For this purpose the actual electron current collected by such electrodes may be utilized where such electrodes are poorly secondary emissive. If they are highly secondary-emissive, the secondary-emission current may be thus utilized, or the difference between primary and secondary emission currents may be used. Additional amplification may be used as desired, either by conventional amplifier tubes or electron multiplication within the tube itself, in conventional manner.

An alternate method of providing remote indication of the beam position and, hence, of the count attained, in place of indicia marked upon the fluorescent screen as above, is to employ the bright spot produced on the fluorescent screen by the portion of the beam passing the target to actuate photocells or similar light-sensitive apparatus to provide output signals corresponding to the location of the beam, which may be used for remote indication or any desired control function.

In any of the above described forms of the invention, indication of the beam position can also be obtained from the voltage developed at the deflecting electrodes as the beam is held in its various equilibrium positions. Such indication can be displayed by a separate voltage indicator coupled to the horizontal deflecting electrodes.

It will be noted that in some figures the resetting or limiting electrodes are in front of the target electrode, and in others behind the target electrode. In general, when properly designed either arrangement may be used, or they may also be located in the same plane, since similar action will occur.

Where the reset or limiting electrodes are illustrated as overlapping, it will be understood that this is not a necessary condition; it is sufficient that these electrodes be in alignment or so closely spaced that the beam can simultaneously impinge on both the main electrode and the reset or limiting electrode.

In the various forms of the invention described above, the target and auxiliary electrodes are constructed of materials having shapes as shown in the figures. However, such shapes may also be effectively obtained by placing shadowing plates fashioned as the "negatives" of the desired shapes in front of simply shaped target plates. Operation as described above would be obtained with this arrangement.

In addition, the portion of the beam intercepted by the shadowing plates may be used to supplement the current flowing to the target plates for control purposes. Similarly when using target plates as in the figures above, additional plates may be located behind them and the current flowing to these additional plates may also be used for control purposes. In both of these cases the pairs of plates may be made of materials of low secondary emission ratio, employing the primary beam current for control purposes, or both may be made of materials of high secondary emission ratio and a collector electrode employed, to obtain enhanced operation, or one may be of the first type and the other the second.

Alternatively, a single simply shaped plate may be used as a target electrode, the shapes required in the various forms of the invention being effectively obtained by providing that appropriate portions of the plate be highly secondary emissive and others poorly secondary emissive. The current in the circuit of such a target is dependent on the beam's impingement upon a highly or poorly secondary emissive portion, and so such a target also permits of control of the beam's position.

In the embodiments of the invention described above, special electrodes are incorporated into the structures of the tubes. However operation as described in the invention may also be obtained using ordinary cathode ray tubes together with photocells and means for assuring that the light from certain sections of the fluorescent screen of the cathode ray tube reaches a certain photocell or photocells and is excluded from another or others.

Ordinary optical means may be employed for this purpose including the use of light barriers, color filters, polarizing means, light conducting means, lenses, mirrors, prisms, etc., and combinations of the above.

Figure 12:
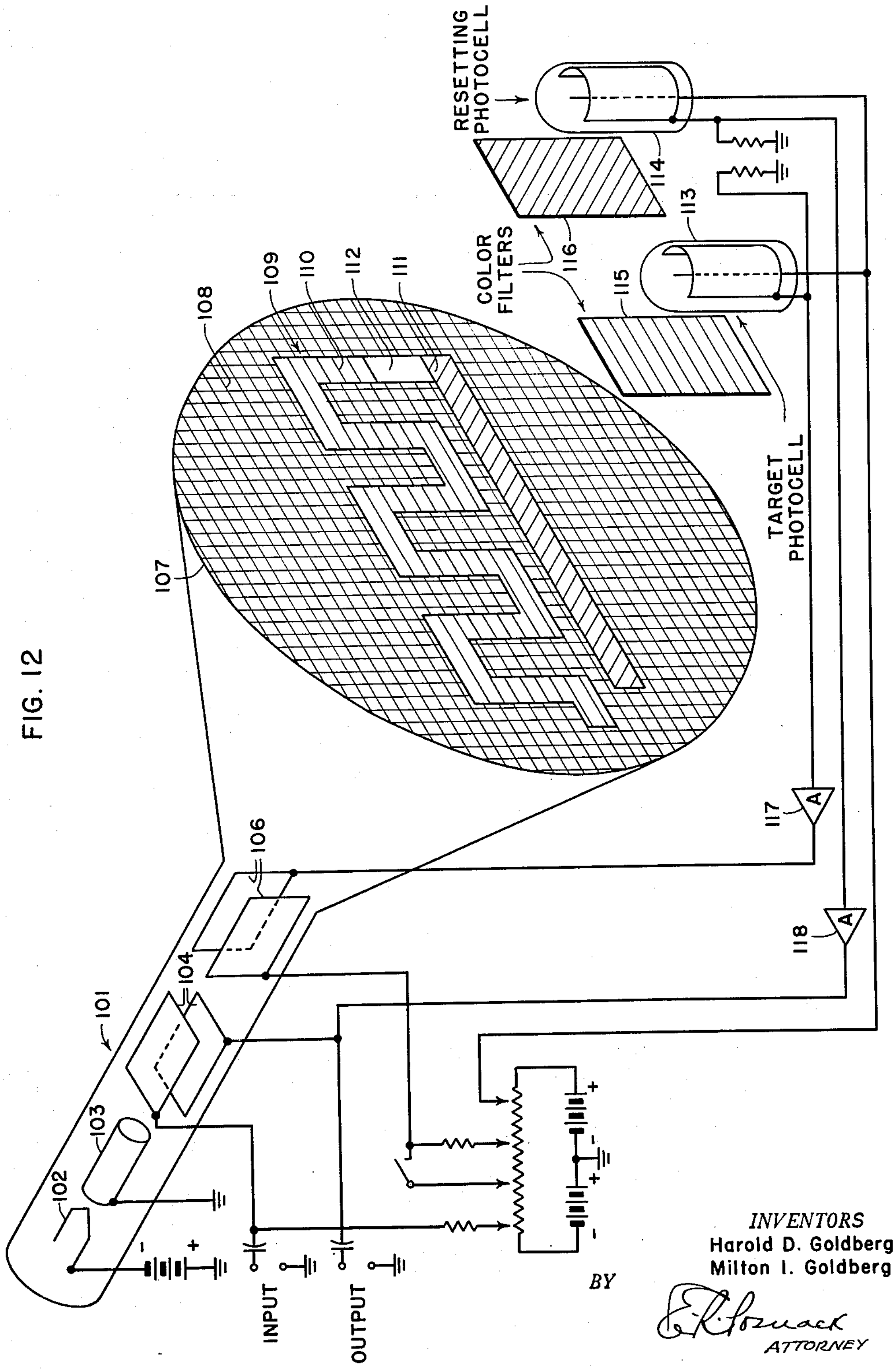
Fig. 12 is a schematic perspective view of another form of the invention using an ordinary cathode ray tube in conjunction with light-modifying elements and photocells to attain the same results as in Figs. 1-11.

An illustrative arrangement employs a basic configuration such as that shown in Fig. 2 and is illustrated in Fig. 12. In this figure there is shown a cathode ray tube 101 having a conventional cathode 102 and acceleration anode 103, a pair of conventional vertical deflecting plates 104, a pair of conventional horizontal deflecting plates 106, and a conventional fluorescent screen 107 adapted to produce a bright spot preferably white in color, so as to include both blue and green components, to be used as will be described. Placed in front of the fluorescent screen 107, on the outside of the tube 101, is a mask 108. This mask 108 may be located directly against the face of cathode ray tube 101, or alternatively may be spaced away therefrom and an optical system employed to produce an image of the fluorescent screen 107 thereupon. Mask 108 contains an aperture 109 having a portion 110 generally of the shape of electrode 18 of Fig. 2, a further portion 111 generally of the shape of the electrode 19 of Fig. 2, and a portion 112 corresponding generally to the portion of electrodes 18 and 19 of Fig. 2 which overlaps. The mask 108 is opaque except for the portions 110, 111, and 112. Located within or across the aperture portion 110 is a light filter adapted to pass only monochromatic light of a predetermined color, such as blue, as indicated by the shading in Fig. 12.

The portion 111 of the aperture 109 has a similar filter therein or thereacross adapted to pass only monochromatic light of a distinctive and different color, such as green, as indicated by the shading thereof. In the region 112 of the aperture 109, light of both the colors of portions 110 and 111 is adapted to pass freely. This can be done, for example, by making this portion 112 completely transparent or open.

Positioned in front of and facing the screen 107 and mask 108 are a pair of photocells 113 and 114 each having a respective filter 115 and 116 in front of the photocell. Optical means may be located between mask 108 and filters 115 and 116 to concentrate light upon photocells 113 and 114. These color filters 115, 116 are respectively of the colors of filters 110 and 111 so that, for example, photocell 113 responds only to light passing through filter 110 while photocell 114 responds only to light passing through filter 111. These photocells 113, 114 respond to light incident thereon to produce voltages which are supplied through respective amplifiers 117, 118 to the horizontal deflecting plates 106 and the vertical deflecting plates 104, respectively.

In operation, the electron beam from the cathode 102 impinges upon the fluorescent screen 107 to produce a bright spot. If this bright spot is aligned with the filter 110, for example, the blue component of the light from the spot will pass through the filter 110 to the photocells 113 and 114. This blue light is received by photocell 113 but not by photocell 114. The output of photocell 113 is then fed through amplifier 117 to the horizontal deflecting plates 106 to control the beam horizontally in exactly the same manner as the beam 14 of Fig. 1 is controlled. Similarly, when the beam spot registers with the green filter 111, only photocell 114 is excited. When the beam spot registers with the transparent portion 112 of mask 108 both photocells 113 and 114 are excited. It will thus be seen that the action in this case is exactly the same as in Fig. 1, since the beam, through the intermediary of the filters and photocells, controls the deflecting plates in exactly the same manner as in Fig. 1. Therefore the beam-stepping action and the pulse-counting action are the same in Fig. 12 as in Fig. 1.

It will be understood that, in using the system thus far disclosed, preferably no light from the outside is allowed to affect the photocells.

The arrangement of filters 110 and 111 and the transparent portion 112 of mask 108, extended where necessary, can be made to conform to any of the electrode systems described above in Figs. 1 to 11, and will produce exactly the same sort of operation, the only difference being that, whereas in the previous forms the electron beam produced the control action by impinging upon a target electrode connected back to the deflecting electrodes, in the present form of the invention the beam produces the same action by being converted into light energy which cooperates with particularly shaped masks and filters and with photocells to control the deflecting electrodes in the same manner. It will be understood that where a limiting effect is desired, corresponding areas are provided on the mask 108, and a further photocell or photocells cooperating only therewith will be used.

It will be clear that any separately filterable colors or portions of the color spectrum could be used, the green and blue colors mentioned being illustrative only.

Indication of the beam's position in its sequence may be obtained in several ways. As has been described above, it may be derived from the voltage developed at the deflecting electrodes as the beam is held at its various equilibrium positions. An additional cathode ray tube or other indicator may be used for this purpose.

However, to be able to observe the position of the beam directly (and hence, the number of impulses received) in a lighted room, an extension of the system here described may be employed. One way of accomplishing this is as follows. A cathode ray tube is used whose phosphor produces blue and green light and, in addition, light of any other color or colors, such as red, for example, and its screen is masked as described above. The target area is covered with a filter which passes only blue and red light, and its photocell window is covered with a filter which passes only blue. The resetting area is covered with a filter which passes only green light and its photocell window is covered with a filter which also passes only green. The area from which light is to reach both photocells is left uncovered. The entire system is enclosed except for a viewing area which is covered with a filter which passes only red.

Operation is essentially as previously described. The target area filter passes only the blue and red components of the light from the fluorescent screen. Only the blue component passes through the target photocell filter. The resetting area filter passes only green light, and only green light passes through the resetting photocell filter. Light from the transparent area reaches both photocells. Therefore the target photocell responds only to light from the target and transparent areas and the resetting photocell responds only to light from the resetting and transparent areas, and normal operation ensues.

Since external light must pass through the viewing area filter, only its red component can enter the system. Neither this red light nor the red light passed by the target area filter can affect the normal operation of the photocells since each photocell filter passes only either blue or green. However, the beam's position on the target area may be observed externally, for the red component of the light from the fluorescent screen passes through both the target area filter and the viewing area filter.

Thus, normal operation is obtained and the beam's position on the target area may be observed in a lighted room.

Alternative to the use of color filters across portions of the face of the cathode ray tube in the photo-electrically operated forms of the invention, as described above, phosphors emitting suitable colors may be deposited in appropriate patterns on the face of the tube.

In general, operation as obtained in the various embodiments of the invention, in which the impingement of an electron beam upon target electrodes develops the controlling voltages, may also be gotten with types employing ordinary cathode ray tubes, together with photocells and associated equipment for accomplishing control of the beam, generally in the maner described relative to Fig. 12, extended where necessary. Additional photocells and associated equipment may also be employed to provide any desired auxiliary functions, such as output signals corresponding to the location of the beam, etc.

While the invention has been described with respect to deflecting plates operating electrostatically, it is to be understood that the same principles can be utilized for magnetic deflection systems or combined electrostatic and electromagnetic deflection systems.

It will thus be seen that the present invention provides a highly useful and reliable device. In general, the stable positions of the beam are determined by equilibrium between the fixed bias force produced by the biasing voltage and the variable force produced either by the beam striking the target or by light reaching the photocell. So long as the latter force exceeds the former when the entire beam strikes the target electrode or when light from the entire spot reaches the photocell, proper equilibrium is obtained despite variation in either bias voltage or other conditions.

Since many modifications of the invention may be evolved by persons skilled in the art, it is to be understood that the above description is illustrative only, and that the invention is to be limited only as defined in the appended claims.

We claim as our invention:

1. An electronic device comprising an electron gun for producing an electron beam, a pair of deflecting means for deflecting said beam in respective first and second independent directions, a target electrode having a plurality of edges extending in said first direction and defining a like plurality of stable beam positions, said electrode being coupled to one of said deflecting means for biasing said beam in one sense in said second direction in response to impingement of said beam on said target electrode, means coupled to said one deflecting means for fixedly biasing said beam in opposite sense in said second direction to assume a position off said target electrode in the absence of energization of said one deflecting means from said target electrode, whereby said stable beam positions are defined by balance of said two biases, a resetting electrode extending in said second direction and partially overlapping said target electrode, said resetting electrode being coupled to the other of said deflecting means for biasing said beam in one sense along said first direction, means fixedly biasing said beam in opposite sense along said first direction, and a pair of limiting electrodes extending along said second direction at opposite extremes of said target electrode and partially overlapping said target electrode, each one of said limiting electrodes being coupled to said other deflecting means for biasing said beam toward the other limiting electrode in response to impingement of said beam on said one limiting electrode, whereby said beam is maintained in the operating range of said target electrode.

2. An electronic device as in claim 1, further including a fluorescent screen in the path of said beam beyond said target electrode for visually indicating the position of said beam.

3. Electronic apparatus for indicating the number of pulses in an input pulse wave, comprising an electron gun for producing an electron beam, two independent deflecting means for deflecting said beam in respective independent directions, means fixedly and continuously energizing one of said deflecting means to tend to deflect said beam in one sense to an extreme position, a target electrode, means connecting said target electrode to said deflecting means to tend to deflect said beam more strongly in an opposite sense in response to impingement of said electron beam thereon, said target electrode having a plurality of strip portions extending transversely of said beam-deflection tendencies whereby a plurality of stable beam positions are defined, each partially on and partially off one of said target electrode strip portions where the oppositely sensed deflection tendencies balance one another, means responsive to each pulse of said pulse wave for deflecting said beam to a position off said target electrode, whereby said oppositely sensed deflection tendency is cut off permitting said beam to be deflected in said one sense to a new stable position, and a resetting electrode located in a position to be struck by said beam in response to an input pulse supplied to said device when said beam is in one extreme of said stable positions, said resetting electrode having a continuous strip portion extending transversely to said plurality of first strip portions and along substantially the entire length of said target electrode, said resetting electrode being coupled to said deflecting means to deflect said beam to impinge upon said continuous strip portion and to maintain said beam in such impingement during substantially the entire length of said target electrode, whereby said beam automatically returns to the opposite extreme stable position.

4. An electronic scaling device comprising an electron gun for producing an electron beam, a pair of independent deflecting means aligned with said gun and adapted to produce deflection of said beam in two independent directions, a rectilinearly serpentine target electrode having linear portions extending along said two independent directions, a resetting electrode having a pair of strip portions extending along said two directions, said portions being in partially overlapping relation to said target electrode, and means fixedly and continuously biasing said beam for deflection in one sense along one of said directions, and means coupling said target electrode to said deflecting means to produce movement of said beam in opposite sense along said one direction in response to impingement of said beam on said target electrode.

5. A device as in claim 4 wherein said target electrode has a serpentine portion and another portion and further including means coupled to one of said deflecting means fixedly and continuously biasing said beam for deflection transversely to said one sense and off said serpentine target portion.

6. A device as in claim 5 further including a separate limiting electrode extending in said one direction and partially overlapping said serpentine target electrode, and wherein said resetting electrode portion extending in said one direction and overlapping said serpentine target electrode serves also as a limiting electrode, said resetting electrode including a third portion also extending in said one direction.

7. A device as in claim 4, further including means coupling said resetting electrode to said deflecting means to produce movement of said beam in the other of said directions in response to impingement of said beam on said resetting electrode.

8. An electronic device comprising an electron gun for producing an electron beam, a pair of independent deflecting means along the path of said beam, a target electrode in said beam path, means coupled to one of said deflecting means for fixedly and continuously urging said beam toward an extreme position off said target electrode, and means coupling said target electrode to said same one deflecting means for urging said beam in an opposite direction, a resetting electrode partially overlapping said target electrode, and limiting electrode means partially overlapping said target electrode.

9. A device as in claim 8 wherein said limiting electrode means comprises an electrode which also constitutes said resetting electrode.

10. A device as in claim 8 wherein said limiting electrode means comprises two separate electrodes disposed on either side of said target electrode and overlapping said target electrode, and one of said separate electrodes also constitutes said resetting electrode.

11. A device as in claim 10, including further means for fixedly and continuously urging said beam in a direction transverse to that of said first beam-urging means toward an extreme position off said target electrode.

12. Apparatus for determining the algebraic sum of the numbers of positive and negative pulses in a pulse wave, comprising a target electrode defining a serpentine conductive portion and an adjacent serpentine opening bounded by conductive material, means for producing an electron beam and for projecting it at said target electrode, means fixedly and continuously biasing said beam for movement in a predetermined direction along a line intersecting both said conductive portion and said opening, and means responsive to said pulses for moving said beam in transverse directions in senses respectively corresponding to the polarity of said pulses.

13. Apparatus as in claim 12, further comprising means responsive to impingement of said beam upon said target electrode for deflecting said beam along said line oppositely to said predetermined direction.

14. Apparatus as in claim 13, further comprising means responsive to movement of said beam along said line to either extreme of said target electrode for transferring said beam to the other extreme thereof.

15. An electronic device comprising an electron gun for producing an electron beam, a pair of deflecting means for deflecting said beam in respective first and second directions, means defining a plurality of stable beam positions along said first direction, means responsive to deflection of said beam in said second direction for stepping said beam from one stable beam position to an adjacent position, resetting means for transferring said beam from one extreme stable position to the other extreme stable position, means fixedly and continuously urging said beam in said second direction to an extreme position, and limiting means for rendering said device independent of stray changes in operating conditions, said last means comprising an electrode extending along said first direction and coupled to one of said deflecting means for urging said beam in an opposite sense in said second direction.

16. A device as in claim 15, wherein said last-named limiting means comprises a second electrode extending along said first direction and spaced from said first electrode to define an operating range for said beam therebetween.

17. An electronic device as in claim 15, further including resetting electrode means for restoring said beam from a position at the end of its travel in said first direction to a position at the beginning of said travel.

18. An electronic device as in claim 15 wherein said limiting means and said resetting means include the same electrode.

References Cited in the file of this patent

UNITED STATES PATENTS

| | | |
|---|---|---|
| 2,404,106 | Snyder | July 16, 1946 |
| 2,417,450 | Sears | Mar. 18, 1947 |
| 2,455,532 | Sunstein | Dec. 7, 1948 |
| 2,463,710 | Montani | Mar. 8, 1949 |
| 2,540,016 | Sunstein | Jan. 30, 1951 |
| 2,568,449 | Hansen | Sept. 18, 1951 |
| 2,666,162 | Hollway et al. | Jan. 12, 1954 |